United States Patent [19]

Komatsu et al.

[11] Patent Number: 5,116,660
[45] Date of Patent: May 26, 1992

[54] DEOXIDIZER FILM

[75] Inventors: Toshio Komatsu, Inashiki; Yoshiaki Inoue, Tokyo, both of Japan

[73] Assignee: Mitsubishi Gas Chemical Company, Inc., Japan

[21] Appl. No.: 403,482

[22] Filed: Sep. 6, 1989

[30] Foreign Application Priority Data

Sep. 8, 1988 [JP] Japan .................. 63-223571

[51] Int. Cl.$^5$ .................. B32B 23/02; B32B 5/16
[52] U.S. Cl. .................. 428/192; 428/329; 428/331; 428/215; 428/35.3; 428/35.4; 428/421; 428/477.7; 428/483; 428/516; 428/481; 428/479.6; 428/512; 206/204; 206/484.1; 264/176.1
[58] Field of Search .................. 428/35.3, 35.4, 305.5, 428/308.4, 329, 331, 516, 192, 421, 477.7, 483, 910

[56] References Cited

U.S. PATENT DOCUMENTS

| | | | |
|---|---|---|---|
| 4,560,741 | 12/1985 | Davis et al. | 428/35.4 |
| 4,769,175 | 9/1988 | Inoue | 252/188.28 |
| 4,856,649 | 8/1989 | Inoue | 428/36.6 |

FOREIGN PATENT DOCUMENTS

| | | | |
|---|---|---|---|
| A2 4073 | 9/1979 | European Pat. Off. | |
| A3 329897 | 8/1989 | European Pat. Off. | |
| 3806761 | 9/1988 | Fed. Rep. of Germany | 428/35.4 |
| 55-44344 | 3/1980 | Japan | |
| 55-90535 | 7/1980 | Japan | |
| 0090535 | 7/1980 | Japan | 428/35.3 |
| 56-26524 | 3/1981 | Japan | |
| 63-36814 | 5/1987 | Japan | |
| 63-40734 | 8/1988 | Japan | |

Primary Examiner—P. C. Sluby
Attorney, Agent, or Firm—Leydig, Voit & Mayer

[57] ABSTRACT

A deoxidizer film for use in storage of food products or the like has a film body made of a thermoplastic resin in which a deoxidizer composition is dispersed. The film body is uni-axially or bi-axially drawn and has minute pores. The deoxidizer composition typically contains iron powder and a metal halide. The deoxidizer film can have a laminate structure in which the above-mentioned film body is laminated to a film body made of a thermoplastic resin and containing a filler which is insoluble in water or has a small solubility in water.

36 Claims, 4 Drawing Sheets

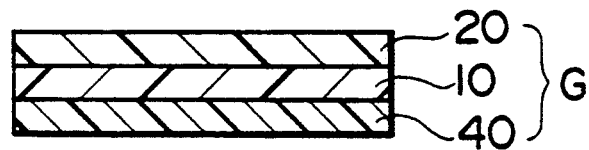
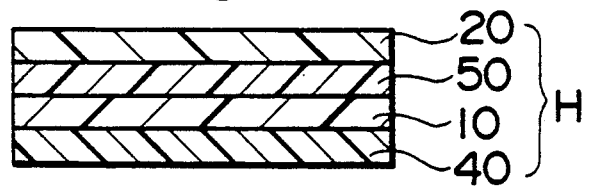
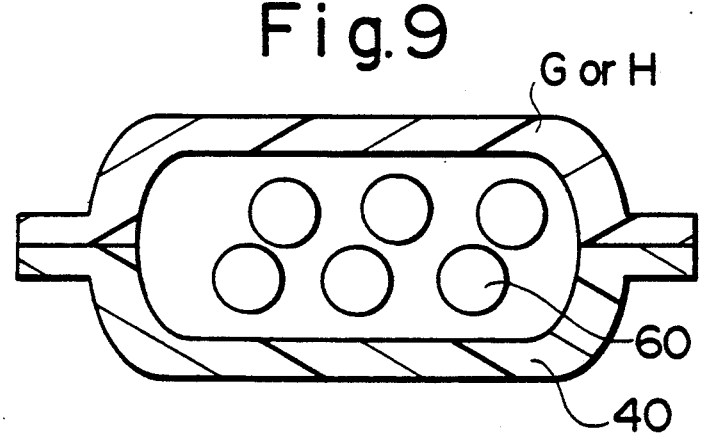

5,116,660

DEOXIDIZER FILM

BACKGROUND OF THE INVENTION

1. Field of the Invention

The present invention relates to an oxygen-removing material (hereinafter referred to as "a deoxidizer") in the form of a film (referred to as "deoxidizer film" hereinafter) for avoiding rottenness, degeneration or degradation of the foods.

2. Description of the Related Art

Deoxidizers are conveniently used in storing foods, particularly processed foods, because of their superior properties for preventing oxidation degradation, and generation of mildew and microaerobions.

Deoxidizers conventionally used for the purpose of storing foods are prepared in the form of powders or particles charged in small sacks made of gas-permeable materials. A sack charged with the powder of a deoxidizer often has an appearance resembling that of a food package, causing a risk for the purchaser of accidentally eating the deoxidizer. A deoxidizer sack found in a mass of food sometimes imparts unpleasantness or suspicion to the purchaser. In addition, a sack of deoxidizer, when packaged together with foods in a package made of a gas-barrier material, impairs the appearance of the food package as a commercial product due to irregularities in the thickness of the sack.

Various sheet-type deoxidizers have been proposed to overcome the above-described problems of the deoxidizer sacks charged with powdered deoxidizers. For instance, Japanese Patent Unexamined Publication No. 54-114585 discloses a sheet-type deoxidizer formed by coating a sheet of a plastic or paper with a coating material in which a deoxidizer composition is blended. Japanese Patent Unexamined Publication No. 54-44344 discloses a sheet which is made of a material prepared by blending a deoxidizer composition with a thermoplastic resin. A sheet-type deoxidizer disclosed in Japanese Patent Unexamined Publication No. 56-26524 is produced by forming a sheet from a blend of a deoxidizer composition and a foamable resin and then allowing the resin to foam. In Japanese Utility Model Unexamined Publication No. 60-10768, a deoxidizer composition is sprayed to an adhesive layer which coats a base sheet. Japanese Patent Unexamined Publication No. 55-106519 discloses a sheet-type deoxidizer which is formed by applying an adhesive to a fibrous sheet, dispersing a deoxidizer composition in the fibrous sheet, and bonding this fibrous sheet to another fibrous sheet to which the same adhesive is applied. Japanese Patent Unexamined Publication No. 55-109428 discloses a sheet-type deoxidizer having a deoxidizer layer composed of a porous layer with its pores filled with a deoxidizer composition.

These known sheet-type deoxidizers, however, suffer from various disadvantages. For instance, a sheet formed from a blend of a coating resin material and a deoxidizer composition, even when it is of foamed type, encounters a problem in that the oxygen absorption performance is limited so that the deoxidizing rate is small and oxygen absorption capacity is also small as compared with conventional deoxidizer charged in a gas-permeable sack. The sheet-type deoxidizer produced by spraying a deoxidizer composition on an adhesive layer also is disadvantageous in that the oxygen absorption capacity per unit area is impractically small because of too small a quantity of composition carried by the adhesive layer. The sheet-type deoxidizer having a porous base sheet suffers from the following disadvantage, particularly when iron powder is used as the deoxidizer which fills the pores. Namely, the iron powder tends to be concentrated at the bottoms of the pores in the porous base sheet due to its large specific weight so that it is difficult to uniformly disperse the iron powder even if a fibrous sheet having mingling fibers such as a non-woven cloth is used as the porous base sheet. In addition, it is difficult to fix the deoxidizer composition in this type of sheet. For these reasons, problems are often experienced such as scattering of the deoxidizer powder from a cut edge of the sheet and easy separation of the outer film.

SUMMARY OF THE INVENTION

Accordingly, it is an object of the present invention to provide a deoxidizer in the form of a film so as to eliminate any risk of eating, as well as unpleasantness, while attaining superior characteristics such as a high deoxidation speed, a large oxygen absorption capacity and ease of fixing of the deoxidizer composition, thereby overcoming the above-described problems of the prior art.

To this end, according to one aspect of the present invention, there is provided a deoxidizer film comprising: a film body containing a thermoplastic resin and a deoxidizer composition, the deoxidizer composition being dispersed in the film body, and the film body having minute pores.

According to another aspect of the present invention, there is provided a deoxidizer film comprising: a first film body containing a thermoplastic resin and a deoxidizer composition, the deoxidizer composition being dispersed in the first film body, and the first film body having minute pores; and a second film body laminated on one or both sides of the first film body, the second film body containing a thermoplastic resin and a filler which is substantially insoluble in water, the filler being dispersed in the second film body, and the second film body having minute pores.

Various compositions capable of absorbing oxygen can be used as the deoxidizer composition in the deoxidizer film of the present invention. Among such deoxidizer compositions, suitably used are compositions which contain, as their major components, iron powder, ferrous salt, ascorbic acid and its salt, or catechol. In particular, deoxidizer compositions containing iron powder are used most suitably. When a deoxidizer composition containing iron powder is used as the deoxidizer composition, it is preferred to add a metal halide and, in addition, an additive or additives such as activated carbon, a filler that is substantially insoluble in water, and so forth. Such a deoxidizer composition may be a mere blend of these components. However, in order to attain higher degree of oxygen absorption activity, it is preferred to coat the surfaces of iron powder particles or particles of a mixture of iron powder and additives such as activated carbon, with a salt of a metal halide, or to rub a metal halide salt into the surfaces of such particles. The particle or grain size of the deoxidizer composition is preferably small. More specifically, the particle size of the deoxidizer composition is preferably not greater than 100 $\mu$ and, more preferably, not greater than 50$\mu$.

The filler is an inorganic material or an organic material which is insoluble in water or which has small solubility in water. Examples of materials of such fillers are silica, calcium carbonate, alumina, titanium white barium sulfate, zeolite, diatomaceous earth, activated clay, acidic clay, talc, bentonite, iron oxide and so forth. The filler preferably has a small particle size. More specifically, the filler particle size is preferably not greater than $10\mu$ and more preferably not greater than $5\mu$.

Various thermoplastic resins capable of being drawn into films can be used in the present invention. The thermoplastic resin used as the material of the first film body containing the deoxidizer composition and the thermoplastic resin used as the material of the second film body containing filler substantially water-insoluble may be the same or, alternatively, different thermoplastic resins may be used as the materials of these film bodies. Examples of the thermoplastic resins suitably used are polyolefins such as polyethylene, polypropylene and polyethylpentene, polyamides such as nylon and so forth, polyesters such as polyethylene terephthalate and so forth, and polyfluoro olefins such as poly tetrafluoroethylene and so forth. Among these resins, polyolefin resins are used most suitably.

The first and the second film bodies of thermoplastic resin or resins contain, respectively, a deoxidizer composition and a filler substantially water-insoluble dispersed therein. The dispersion of the deoxidizer composition or the filler substantially water-insoluble in the thermoplastic resin films can be conducted, for example, by a process which has the steps of preparing a mixture of the thermoplastic resin and the deoxidizer composition or the filler material, heating the mixture to a temperature above the melting point of the thermoplastic resin so as to melt the thermoplastic resin, and forming the melt into a film.

The first and second film bodies of thermoplastic resin or resins containing the deoxidizer composition and the filler substantially water-insoluble, respectively, may be drawn uni-axially or bi-axially, generally at a drawing ratio of 1.01:1 to 10:1, preferably 1.1:1 to 4:1, more preferably 1.2:1 to 2:1. By such a drawing, the film bodies have minute pores with round or cracked configuration. The diameter of each minute pore is preferably 0.01 to $600\mu$, more preferably 0.1 to $500\mu$.

The thickness of the film body containing the deoxidizer composition may be suitably determined depending on necessary oxygen absorption capacity, provided that it is not smaller than the particle size of the deoxidizer composition. The thickness of the film body containing the substantially water-insoluble filler also has no limitation, though it is usually preferred to be not smaller than $20\mu$ and not greater than $200\mu$.

The laminate film composed of the film body (A) containing a deoxidizer composition and the film body (B) containing a substantially water-insoluble filler may be formed by preparing the film bodies (A) and (B) with minute pores separately and then bonding these film bodies or, alternatively, simultaneously extruding the film body (A) and the film body (B) so as to form a two-layered film followed by drawing to provide the minute pores. It is also possible to simultaneously extrude the material of the film body (B) on both sides of the material of the film body (A) so as to form a three-layered film composed of two layers of the film body (B) and a layer of the film body (A) interposed therebetween.

The deoxidizer film composed solely of the film body containing a deoxidizer composition and the laminate-type deoxidizer film mentioned above may be used without any treatment. In such a case, the single film body or the laminate-type deoxidizer film composed of a plurality of film bodies can function satisfactorily when the equilibrium humidity in the sealed system is 60% or higher. The above-mentioned two- or three-layered laminate film, in which a film body containing a substantially water-insoluble filler is superposed on one or both sides of a film body containing a deoxidizer composition, is preferred because the film body containing the filler effectively suppresses exudation of the deoxidizer composition during absorption of oxygen. When the laminate-type deoxidizer film is used in contact with a food, the film body containing the filler effectively prevents any exudate from the food to be transferred to the deoxidizer agent.

When the deoxidizer film composed of a single film body containing a deoxidizer composition or the laminate film of the type mentioned above is used in a dry condition in which the equilibrium humidity is low, it is preferred that the single film body or the laminate film composed of film bodies is made to contain water, in order to produce a high oxygen absorption effect. In such a case, for the purpose of facilitating impregnation of the film body or the laminate film with water, it is preferred that a deliquescent substance such as a metal halide or a water-absorbing resin is added to the deoxidizer composition.

When the deoxidizer film is used in an atmosphere having an extremely high humidity or in an oxygen gas atmosphere, transfer of substance due to exudation may take place at an edge of the deoxidizer film, even if the film is of the laminated type having both surface layers containing a filler substantially water-insoluble filler. Therefore, the deoxidizer film of the present invention, irrespective of whether it is a single film body or of the laminate type, may be preferably covered by outer layers of a gas-permeable sheet or sheets covering the deoxidizer film, or exposed peripheral edge of the deoxidizer film having such outer layers may further be coated by adhesives, thermoplastic resin or its hot melts. The deoxidizer film may be further packed in a sack made of a gas-permeable material. The gas-permeable sheet or sack may be made of any one of materials which are ordinarily used as the material of sacks containing deoxidizers. Examples of such a gas-permeable sheet or sack are a laminate sheet composed of a paper and a porous film covering one or both sides of the paper sheet, a water-proof non-woven cloth, synthetic paper and/or a laminate of one of these sheet materials with another gas-permeable film.

The deoxidizer film of the present invention in the form of the type composed of a single film body or of the laminate type contains a deoxidizer component fixed therein, thus preventing the deoxidizer composition from coming off. In addition, fine cracks generated in the vicinity of the deoxidizer composition prevents any degradation in the deoxidation performance.

BRIEF DESCRIPTION OF THE DRAWINGS

FIGS. 1 to 8 are illustrations of deoxidizer films of the present invention of the type composed of a single film body or of the laminate type, as well as containers which incorporate deoxidizer films of the invention of the type composed of a single film body or of the laminate type; and FIGS. 9 to 11 are illustrations of food packaging containers incorporating deoxidizer films of the invention of the type composed of a single film body or of the laminate type.

DESCRIPTION OF THE PREFERRED EMBODIMENTS

Preferred embodiments of the present invention will be described with reference to the accompanying drawings.

Figure 1:

FIG. 1 shows a deoxidizer film 10 of the present invention of the type composed of a single film body. This deoxidizer film has a film body which is made of a polyolefin film drawn from a polyolefin film material containing a deoxidizer composition which is composed mainly of iron powder and a metal halide.

Figure 2:
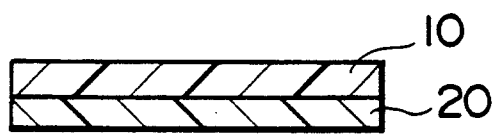

FIG. 2 shows a deoxidizer film of two-layered laminate type having a first film body 10 containing a deoxidizer composition and a second film body 20 containing a filler substantially insoluble in water, the film bodies 10 and 20 being suitably integrated to form the laminate structure. The film body 20 containing a filler substantially insoluble in water is formed by drawing from a polyolefin film material containing silica or the like as the filler.

Figure 3:
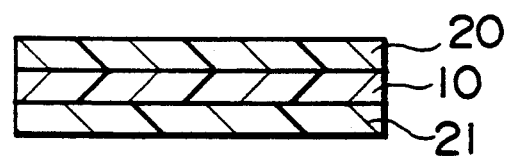

FIG. 3 shows another deoxidizer film of the invention in the form of a laminate film having film bodies 20, 21 which contain a filler substantially insoluble in water and which are provided on both surfaces of a film body 10 containing a deoxidizer composition.

Figure 4:
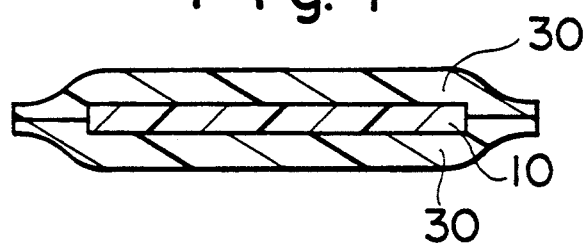

FIG. 4 shows a different deoxidizer film of the present invention in which a gas-permeable sheet 30 is provided to cover a film body 10 containing a deoxidizer composition. In this case, the entire area of each surface of the film body 10 is covered with the gas-permeable sheet 30. This type of deoxidizer film may be modified such that only one side of the deoxidizer-containing film 10 is covered by the gas-permeable sheet, while the other surface is covered by a gas-barrier film. The deoxidizer film of the above-described modification can be used as deoxidizing packaging materials capable of preventing transfer of exudation. In order to further ensure prevention of transfer of exudation, any sheared or exposed peripheral edge of the deoxidizer film with the above modifications may be coated by resins in the form of adhesives or hot melt resins. Alternatively, the peripheral edge of the deoxidizer film with the gas-permeable sheet in the outermost layer maybe cut by heat melting.

Figure 5:
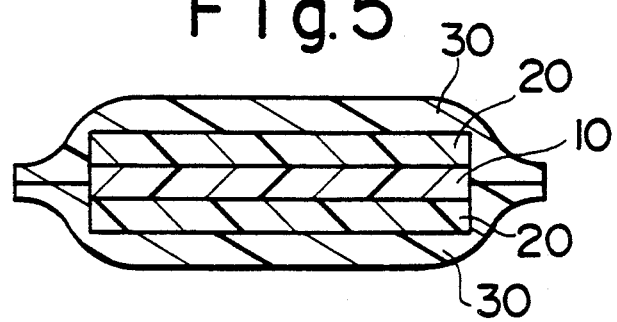

FIG. 5 shows a deoxidizer film of the invention in the layer constituted by a deoxidizer containing film body 10 and both outer layers constituted by film bodies 20 containing a filler which is substantially insoluble in water. The entire surfaces of this three-layered laminate type deoxidizer film is coated with gas-permeable sheets 30. In order to further ensure prevention of transfer of exudation, any sheared or exposed peripheral edge of the deoxidizer film with the above modifications may be coated by resins in the form of adhesives or hot melt resins. Alternatively, the peripheral edge of the deoxidizer film with the gas-permeable sheet in the outermost layer may be cut by heat melting.

Figure 6:
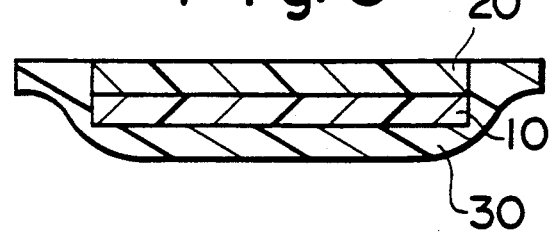

FIG. 6 shows a different deoxidizer film of the invention in the form of laminate film having two layers: namely, a film body 20 containing a filler which is substantially insoluble in water and a deoxidizer-containing film body 10 which is coated with a gas-permeable sheet 30. This embodiment may be modified such that the surface of the film body 20 opposite to the film body 10 containing the deoxidizer composition is coated with a gas-barrier film, and such a modification can conveniently be used as a packaging material capable of preventing transfer of exudate.

FIG. 7 shows a different deoxidizer film of the invention in the form of laminate film having two layers: namely, a film body 20 containing a filler which is substantially insoluble in water and a film body 10 containing a deoxidizer composition and coated with a gas-barrier film 40. This deoxidizer film can conveniently be used as a deoxidizing packaging material which is generally represented by G. A laminate film having an inner adhesive surface may be used as the gas-barrier film 40. The use of such a film material having adhesive surface exhibits good bondability to the film body containing the deoxidizer composition.

FIG. 8 shows a different deoxidizer film of the invention in which a film body 10 containing a deoxidizer composition and a film body 20 containing a filler substantially insoluble in water are laminated through the intermediary of a gas-permeable non-woven cloth 50, and a gas barrier film body 40 covering the deoxidizer-containing film body 10. The intermediate non-woven cloth layer 50 improves the strength of bonding between the deoxidizer-containing film body 10 and the gas-barrier film 40 and, hence, the strength of the whole laminate film structure, without impairing the gas-permeability. The non-woven cloth layer 50, which is provided between the film bodies 10 and 20 in the illustrated case, may be provided between any pair of adjacent layers in the laminate structure. It is also possible to use two or more such non-woven cloth layers. It is also preferred that the non-woven cloth layer 50 is provided on the inner side of the film 20 containing the filler substantially insoluble in water. The deoxidizer laminate film structure of FIG. 8, generally represented by H, can conveniently be used as a packaging material.

FIG. 9 illustrates the use of the deoxidizing film packaging material G or H of FIG. 7 or FIG. 8 as a material for packaging container for storing a food product 60. The packaging container is composed of the deoxidizing film packaging material G or H and a gas-barrier film 40 which are brought together to form a sack-type container containing a food product 60.

Figure 10:
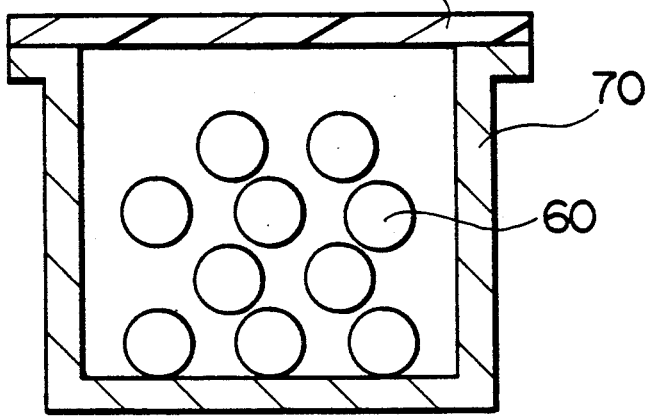

FIG. 10 shows another example of the use of the deoxidizing film packaging material G or H of FIG. 7 or FIG. 8 in storing a food product. The deoxidizing film packaging material G or H is used to close an open top of a vessel 70 made of an oxygen-impermeable material containing food product 60.

Figure 11:
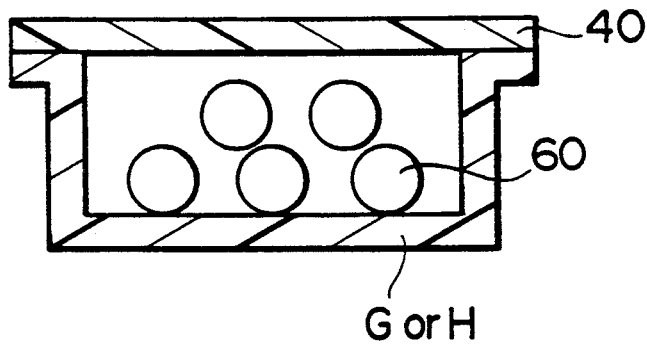

FIG. 11 shows still another example of the use of the deoxidizing film packaging material G or H of FIG. 7 or FIG. 8 for the purpose of storing a food product. The deoxidizing film packaging material G or H is shaped into a vessel with a top opening which is closed by a gas-barrier film 40. The food product 60 is contained in the vessel made of the deoxidizing film packaging material G or H.

In the examples shown in FIGS. 9 to 11, the whole area of the deoxidizing film packaging material contributes to absorption of oxygen. This, however, is not essential and the arrangement may be such that only a local portion or portions of the packaging material produce the deoxidation effect.

EXAMPLES

Example 1

A mixture was formed from 100 weight parts of iron powder having a mean particle size of 50 μ and 2 weight parts of activated carbon. The mixture was blended together with 20 weight % of brine so that heat was generated to evaporate water, whereby partially oxidized iron powder with deposition of activated carbon and sodium chloride on the particle surfaces was obtained. The iron powder was mixed with 400 weight parts of polyethylene and the mixture was pulverized. The pulverized mixture was heated to 190° C. so as to be molten and the melt was extruded into a film by an extruder so that a film body containing a deoxidizer composition and having a thickness of 100 μ was obtained. The film was bi-axially drawn at a drawing ratio of about 2.0 in both directions, whereby a deoxidizer-containing film having minute pores of the present invention was obtained.

A test piece of the thus produced deoxidizer-containing film, having an area of 100 cm², was sealed together with 50 ml of air in an atmosphere having a relative humidity of 90%. After 3-day storage of the film, the concentration of oxygen in the sealed atmosphere was measured. The oxygen concentration was as small as 0.1% or less.

Example 2

A mixture was formed from 100 weight parts of iron powder having a mean particle size of 50 μ, 2 weight parts of activated carbon, and 2 weight parts of sodium chloride. After the mixture was finely ground, 100 weight parts of polyethylene was added and the mixture was further blended and pulverized so as to form a compound (A).

A component (B) was prepared by blending and pulverizing a mixture formed of 40 weight parts of silica having a mean particle size of 5 μ and 60 weight parts of polyethylene.

The components A and B were respectively heated to 190° C. so as to be molten, and the melts of these compounds were extruded from a composite extruder capable of simultaneously extruding three layers in the order: component (B), the component (A) and the component (B), whereby a laminate film having three layers and a total thickness of 250 μ was obtained. The film thus obtained was drawn uni-axially at a ratio of 3.0 and at the temperature of 50° C., whereby a deoxidizer film of the invention containing a deoxidizer composition and having minute pores was obtained.

A test piece of the thus produced deoxidizer-containing film, having an area of 100 cm², was sealed together with 50 ml of air in an atmosphere having a relative humidity of 90%. After 3-day storage of the film, the concentration of oxygen in the sealed atmosphere was measured. The oxygen concentration was as small as 0.1% or less.

As will be understood from the foregoing description, the deoxidizer film of the present invention of the type composed of a single film body or of a laminate film type offers the following advantages.

Firstly, it is to be noted that the deoxidizer film of the present invention, containing a deoxidizer composition fixed therein, is free from the problem of scattering of deoxidizer composition from a broken deoxidizer sack. In addition, the film-shaped deoxidizer of the invention is easily discriminable from the food products, thus eliminating any risk of eating.

A laminate type deoxidizer film of the invention, having a gas-barrier film on its one side and a film containing substantially water-insoluble filler on the other side, can conveniently be used as a material of a deoxidizing packaging sack which is suitable for storage of food product or the like.

The deoxidizer film of the invention of course can be used as it is or may be placed in a small sack made of a gas-permeable material. It is also possible to use the deoxidizer film of the invention of the laminate type in the form of a single sheet such as an advertising or information sheet or a base sheet for wrapping a food product. Thus, the deoxidizer film of the present invention does not impart any unpleasantness or suspicion when placed in or among foods or other types of products.

The deoxidizer film of the present invention can easily be fixed to the inner surface of a package or sack if the resin material such as a polyolefin heat-bondable to a sealant layer of the package or sack is used as the material of the deoxidizer film.

What is claimed is:

1. A deoxidizer film comprising:
   a film body containing a thermoplastic resin and a deoxidizer composition, said deoxidizer composition being dispersed in said thermoplastic resin, and said film body having pores with a diameter of 0.01 to 600 μ formed by drawing said film body at a drawing ratio of 1.01:1 to 10:1.

2. A deoxidizer film according to claim 1, wherein said deoxidizer composition comprises iron powder and a metal halide.

3. A deoxidizer film according to claim 1, wherein the particle size of said deoxidizer composition is 100 μ or less.

4. A deoxidizer film according to claim 1, wherein said thermoplastic resin is a resin selected from a group consisting of a polyolefin, polyamide, polyester and a polyfluoro olefin.

5. A deoxidizer film according to claim 3, wherein the thickness of said film body is not smaller than the particle size of said deoxidizer composition.

6. A deoxidizer film according to claim 1, wherein said film body is formed by heating a mixture of said thermoplastic resin and said deoxidizer composition into a molten material, forming said molten material into a film, and drawing said film.

7. A deoxidizer film according to claim 1 wherein said film body in which said deoxidizer composition is dispersed, is drawn uni-axially.

8. A deoxidizer film according to claim 7 wherein the drawing ratio of said film body is 1.2:1 to 10:1.

9. A deoxidizer film according to claim 7 wherein the drawing ratio of said film body is 1.1:1 to 4:1.

10. A deoxidizer film according to claim 1 wherein said film body in which said deoxidizer composition is dispersed, is drawn bi-axially.

11. A deoxidizer film according to claim 10 wherein the drawing ratio of said film body is 1.2:1 to 10:1.

12. A deoxidizer film according to claim 10 wherein the drawing ratio of said film body is 1.1:1 to 4:1.

13. A deoxidizer film according to claim 1 wherein the diameter of said minute pores is 0.1 to 500 μ.

14. A deoxidizer film according to claim 1, further comprising an outer layer of a gas-permeable material covering at least an exposed surface of said film body.

15. A deoxidizer film according to claim 1, further comprising an outer layer of a gas-permeable material covering at least the peripheral edge of said film body.

16. A laminated deoxidizer film comprising:
a first film body containing a thermoplastic resin and a deoxidizer composition, said deoxidizer composition being dispersed in said thermoplastic resin of said first film body, and said first film body having pores with a diameter of 0.01 to 600 $\mu$ formed by drawing said first film body at a drawing ratio of 1.01 to 10:1; and
a second film body laminated on one or both sides of said first film body, said second film body containing a thermoplastic resin and a filler which is substantially insoluble in water, said filter being dispersed in said thermoplastic resin of said second film body, and said second film body having pores with a diameter of 0.01 to 600 $\mu$ formed by drawing said second film body.

17. A deoxidizer film according to claim 16, wherein said deoxidizer composition comprises iron powder and a metal halide.

18. A deoxidizer film according to claim 16, wherein said filler is an inorganic material which is substantially insoluble in water.

19. A deoxidizer film according to claim 18, wherein said filler has a particle size not greater than about 10 $\mu$.

20. A deoxidizer film according to claim 16, wherein said thermoplastic resins in said first and second film bodies are resins selected from a group which consists of polyolefins, polyamides, polyesters and polyfluoro olefins.

21. A deoxidizer film according to claim 16, wherein said minute pores in said first and second film bodies are formed by drawing said first and second film bodies.

22. A deoxidizer film according to claim 16, wherein said first film body is formed by heating a first mixture of said thermoplastic resin and said deoxidizer composition into a first molten material, forming said first molten material into a film, and drawing said film.

23. A deoxidizer film according to claim 22, wherein said second film body is formed by heating a second mixture of said thermoplastic resin and said filler which is substantially insoluble in water into a second molten material, forming said second molten material into a film, and drawing said film.

24. A deoxidizer film according to claim 23, wherein said first molten material and said second molten material are extruded simultaneously so as to be laminated to form said film.

25. A deoxidizer film according to claim 16, further comprising an outer layer of a gas-permeable material covering at least the peripheral edges of said laminated first and second film bodies.

26. A deoxidizer film according to claim 16 wherein the particle size of said deoxidizer composition is not more than about 100 $\mu$.

27. A deoxidizer film according to claim 16 wherein the thickness of said first film body is not smaller than the particle size of the deoxidizer composition and the thickness of said second film body is not smaller than 20 $\mu$ and not greater than 200 $\mu$.

28. A deoxidizer film according to claim 16 wherein said laminated film is drawn uni-axially.

29. A deoxidizer film according to claim 28 wherein the drawing ratio of said laminated film is 1.01 to 10.

30. A deoxidizer film according to claim 28 wherein the drawing ratio of said laminated film is 1.1 to 4.

31. A deoxidizer film according to claim 16 wherein said laminated film is drawn bi-axially.

32. A deoxidizer film according to claim 31 wherein the drawing ratio of said laminated film is 1.01 to 10.

33. A deoxidizer film according to claim 31 wherein the drawing ratio of said laminated film is 1.1 to 4.

34. A deoxidizer film according to claim 16 wherein said water-insoluble filler comprises silica.

35. A deoxidizer film according to claim 16, further comprising an outer layer of a gas-permeable material covering at least an exposed surface of said first and second film bodies.

36. A deoxidizer film according to claim 25 wherein said outer layer of gas-permeable material is coextensive with the outer surface of both of said laminated first and second film bodies.

* * * * *